(12) United States Patent
Hood

(10) Patent No.: US 11,551,186 B2
(45) Date of Patent: *Jan. 10, 2023

(54) SYSTEMS AND METHODS TO GENERATE AGENDAS FOR ONE-ON-ONE MEETINGS

(71) Applicant: Asana, Inc., San Francisco, CA (US)

(72) Inventor: Alexander Hood, San Francisco, CA (US)

(73) Assignee: Asana, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/702,517

(22) Filed: Mar. 23, 2022

(65) Prior Publication Data

US 2022/0215344 A1    Jul. 7, 2022

Related U.S. Application Data

(63) Continuation of application No. 17/036,802, filed on Sep. 29, 2020, now Pat. No. 11,386,395.
(Continued)

(51) Int. Cl.
*G06Q 10/10* (2012.01)
*G06Q 10/06* (2012.01)

(52) U.S. Cl.
CPC ..... *G06Q 10/103* (2013.01); *G06Q 10/06398* (2013.01); *G06Q 10/1095* (2013.01)

(58) Field of Classification Search
None
See application file for complete search history.

(56) References Cited

U.S. PATENT DOCUMENTS

| 10,002,345 | B2 | 6/2018 | Ganani |
| 11,265,183 | B1 * | 3/2022 | Iyer ..................... H04L 12/1831 |

(Continued)

FOREIGN PATENT DOCUMENTS

| CA | 2892290 A1 * | 7/2014 | ........... G06Q 10/109 |
| CA | 2892290 A1 | 7/2014 | |

OTHER PUBLICATIONS

G. Fakas and B, Karakostas, "A workflow management system based on intelligent collaborative objects," May 11, 1999, Information and Software Technology, vol. 41, p. 907-915 (Year: 1999).*

*Primary Examiner* — Amanda Gurski

(74) *Attorney, Agent, or Firm* — Esplin & Associates, PC

(57) ABSTRACT

Systems and methods for generating an agenda for a one-on-one meeting are disclosed. Exemplary implementations may: manage environment state information maintaining a collaboration environment, the collaboration environment being configured to facilitate interaction by users with the collaboration environment, the environment state information including work unit records of units of work linked to users within the collaboration environment; obtain user input information conveying user input from individual users to initiate individual meetings with one other individual user; identify the work unit records corresponding to the users of the individual meetings; generate agenda information defining individual agendas for the individual meetings, the individual agendas including individual sets of agenda items, an individual agenda item corresponding to an individual work unit record identified as corresponding to the users of the individual meetings; and/or perform other operations.

20 Claims, 5 Drawing Sheets

Related U.S. Application Data

(60) Provisional application No. 62/705,467, filed on Jun. 29, 2020.

(56) References Cited

U.S. PATENT DOCUMENTS

| | | | |
|---|---|---|---|
| 11,282,036 B1 | 3/2022 | Hood | |
| 2005/0044145 A1 | 2/2005 | Quinn | |
| 2006/0106872 A1 | 5/2006 | Leban | |
| 2006/0200374 A1 | 9/2006 | Nelken | |
| 2007/0233545 A1 | 10/2007 | Cala | |
| 2008/0147471 A1 | 6/2008 | Singh | |
| 2009/0006982 A1* | 1/2009 | Curtis | G06Q 10/10 715/753 |
| 2009/0307045 A1 | 12/2009 | Chakra | |
| 2011/0258015 A1 | 10/2011 | Garrigan | |
| 2012/0013114 A1 | 1/2012 | Glosh | |
| 2012/0179981 A1 | 7/2012 | Whalin | |
| 2013/0024452 A1 | 1/2013 | Defusco | |
| 2013/0060593 A1 | 3/2013 | Motoyama | |
| 2014/0164510 A1 | 6/2014 | Abuelsaad | |
| 2014/0200944 A1 | 7/2014 | Henriksen | |
| 2015/0007056 A1 | 1/2015 | Cohen | |
| 2015/0135095 A1 | 5/2015 | Donneau-Golencer | |
| 2016/0092578 A1* | 3/2016 | Ganani | G06F 16/24575 707/728 |
| 2016/0104120 A1 | 4/2016 | Agrawal | |
| 2016/0344718 A1 | 11/2016 | Pashman | |
| 2017/0053303 A1 | 2/2017 | Smyth | |
| 2017/0310716 A1 | 10/2017 | Lopez Venegas | |
| 2018/0082255 A1* | 3/2018 | Rosati | G06Q 10/1053 |
| 2018/0101281 A1 | 4/2018 | Nelson | |
| 2018/0101760 A1 | 4/2018 | Nelson | |
| 2018/0137469 A1 | 5/2018 | Biehl | |
| 2018/0198746 A1 | 7/2018 | Bastide | |
| 2018/0225636 A1 | 8/2018 | Kumhyr | |
| 2019/0108493 A1 | 4/2019 | Nelson | |
| 2019/0273767 A1* | 9/2019 | Nelson | H04M 7/0027 |
| 2019/0318321 A1 | 10/2019 | Lopez Venegas | |
| 2019/0378076 A1 | 12/2019 | O'Gorman | |
| 2020/0005248 A1 | 1/2020 | Gerzi | |
| 2020/0111046 A1 | 4/2020 | Ball-Marian | |
| 2020/0242524 A1* | 7/2020 | Soundararajan | G06Q 10/06375 |
| 2020/0372436 A1 | 11/2020 | Lee | |
| 2022/0263675 A1* | 8/2022 | Cupala | H04L 65/4015 |

* cited by examiner

SYSTEMS AND METHODS TO GENERATE AGENDAS FOR ONE-ON-ONE MEETINGS

FIELD OF THE DISCLOSURE

The present disclosure relates to systems and methods to generate agendas for one-on-one meetings.

BACKGROUND

Collaboration environments, sometimes referred to as integrated collaboration environments, may enable users to assign projects, tasks, and/or other units of work to assignees (e.g., other users) to complete. A collaboration environment may comprise a virtual environment in which a team of users does its work. A collaboration environment may enable users to work in a more organized and efficient manner. A collaboration environment may integrate additional features and/or functionality such as web-based conferencing and collaboration, desktop videoconferencing, instant message, and/or other feature into a single easy-to-use, intuitive interface.

SUMMARY

One aspect of the present disclosure relates to a system configured to generate agendas for one-on-one meetings. Traditionally, when meetings are scheduled, agenda items and other relevant information may not be readily accessible. Manual navigation through a collaboration environment may be required to obtain relevant information to the meeting. Sometimes relevant information may get lost in communications (e.g., via E-mail, chats, comments, etc.). One or more implementations described herein may automatically determine agenda items for individual one-on-one meetings between users. Such agenda items may be based on units of work corresponding with the users participating in the meeting, particular dates of the units of work, and/or other information related to units of work of the user and/or the users themselves. This automation of agenda items may reduce time spent manually searching and/or obtaining relevant information for units of work to discuss during such meetings.

One or more implementations of a system to generate an agenda for one-on-one meetings may include one or more hardware processors configured by machine-readable instructions. Machine-readable instructions may include one or more instruction components. The instruction components may include computer program components. The instruction components may include one or more of an environment state component, a meeting component, a work unit component, an agenda generation component, and/or other instruction components.

The environment state component may be configured to manage environment state information maintaining a collaboration environment. The collaboration environment may be configured to facilitate interaction by users with the collaboration environment. The environment state information may include work unit records of units of work created by, assigned to, and/or completed by the users within the collaboration environment. By way of non-limiting illustration, the work unit records may include a first set of work unit records and/or one or more other work unit records. The first set of work unit records may be work unit records of a first set of units of work created by, and/or assigned to, and/or completed by a first user.

The meeting component may be configured to obtain user input information and/or other information. The user input information may convey user input from individual users to initiate individual meetings with one other individual user. By way of non-limiting illustration, the user input information may convey the user input from a second user to initiate a first meeting with the first user.

The work unit component may be configured to identify one or more work unit records and/or other records corresponding to the users of the individual meetings. By way of non-limiting illustration, responsive to obtaining the user input of the second user, a first subset of work unit records from the first set of work unit records may be identified.

The agenda generation component may be configured to generate agenda information defining individual agendas for the individual meetings. The individual agendas may include individual sets of agenda items and/or other information. An individual agenda item may correspond to an individual work unit record identified as corresponding to one or more users of an individual meeting. The individual agenda items may include and/or facilitate access to the corresponding ones of the work unit records. By way of non-limiting illustration, the agenda information may define a first agenda for the first meeting. The first agenda may include a first set of agenda items and/or other information. Individual agenda items in the first set of agenda items may correspond to individual work unit records in the first subset of work unit records.

As used herein, any association (or relation, or reflection, or indication, or correspondency) involving servers, processors, client computing platforms, and/or another entity or object that interacts with any part of the system and/or plays a part in the operation of the system, may be a one-to-one association, a one-to-many association, a many-to-one association, and/or a many-to-many association or N-to-M association (note that N and M may be different numbers greater than 1).

As used herein, the term "manage" (and derivatives thereof) may include active and/or passive direction, recommendation, suggestion, approval, rejection to users within a collaboration environment and/or any combination thereof. As used herein, the term "obtain" (and derivatives thereof) may include active and/or passive retrieval, determination, derivation, transfer, upload, download, submission, and/or exchange of information, and/or any combination thereof. As used herein, the term "identify" (and derivatives thereof) may include searching, analyzing, classifying, or describing information, and/or any combination thereof. As used herein, the term "generate" (and derivatives thereof) may include create, develop, and/or set up and/or any combination thereof.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
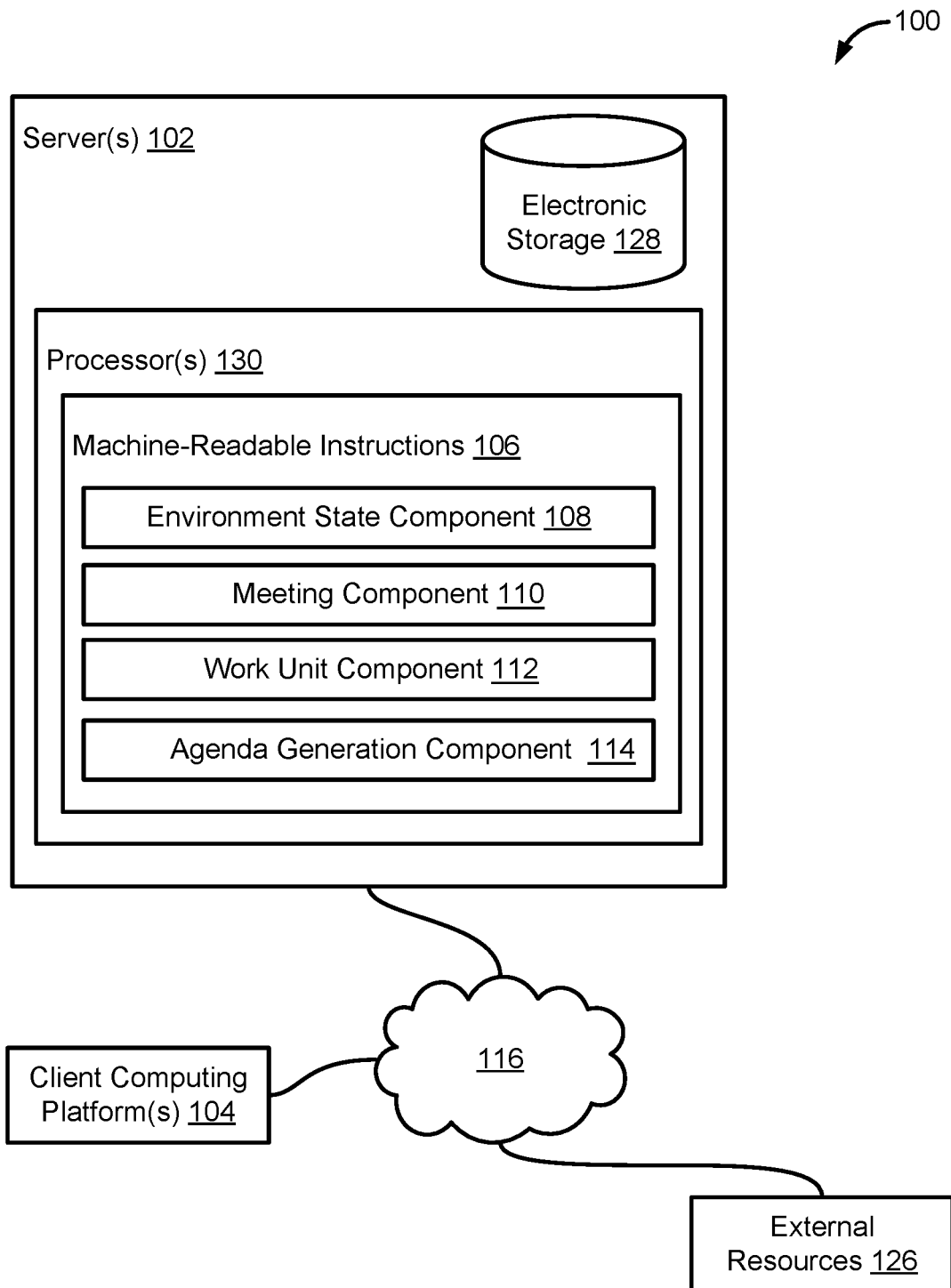
FIG. 1 illustrates a system configured to generate agendas for one-on-one meetings, in accordance with one or more implementations.

FIG. 1 illustrates a system 100 configured to generate agendas for one-on-one meetings, in accordance with one or more implementations. One or more implementations described herein may determine agenda items for individual one-on-one meetings between users. The agenda items may be determined, based on units of work corresponding with one or both users participating in a meeting, particular dates of the units of work, and/or other information related to units of work and/or the users themselves. This automation of agenda items may reduce time spent manually searching and/or obtaining relevant information to discuss during such meetings.

In some implementations, system 100 may include one or more of one or more servers 102, one or more client computing platforms 104, external resources 126, and/or other components. Server(s) 102 may be configured to communicate with one or more client computing platforms 104 according to a client/server architecture and/or other architectures. Client computing platform(s) 104 may be configured to communicate with other client computing platforms via server(s) 102 and/or according to a peer-to-peer architecture and/or other architectures. Users may access system 100 via client computing platform(s) 104.

Server(s) 102 may include one or more of non-transitory electronic storage 128, one or more processors 130 configured by machine-readable instructions 106, and/or other components. Machine-readable instructions 106 may include one or more instruction components. The instruction components may include computer program components. Executing the machine-readable instructions 106 may cause server(s) 102 to facilitate generating agendas for one-on-one meetings. The instruction components may include one or more of an environment state component 108, a meeting component 110, a work unit component 112, an agenda generation component 114, and/or other instruction components.

Environment state component 108 may be configured to manage environment state information and/or other information for maintaining a collaboration environment. Managing may include one or more of obtaining, storing, modifying, updating, and/or other processes. The collaboration environment may be configured to facilitate interaction by users with the collaboration environment. The environment state information may include one or more of work unit records, objective records, and/or other records (sometimes referred to collectively as "records"). The work unit records of units of work may specify units of work created by, assigned to, and/or completed by the users within the collaboration environment. In some implementations, units of work created by, assigned to, and/or completed by the users may refer generally to a linking of the units of work with the individual users in the collaboration environment. A unit of work may be linked with a user in a manner that defines one or more relationships between the user and the unit of work. Such a relationship may connote and/or be a result of an action (past, present, and/or future) of the user with respect to the unit of work. Such actions may include one or more of creating a work unit record for a unit of work, being assigned to participate in a unit of work, participating in a unit of work, being granted access to a work unit record of a unit of work, adjusting a value of a parameter of a work unit record of a unit of work, and/or other actions. The business objectives may be specified within the objective records. Individual objective records may describe individual business objectives and may identify sets of work unit records associated with the individual business objectives.

By way of non-limiting illustration, the work unit records may include a first set of work unit records and/or one or more other work unit records assigned to one or more users. The first set of work unit records may be work unit records of a first set of units of work linked to a first user and/or other users.

The environment state information for maintaining a collaboration environment may include one or more of user information, work information, objective information, and/or other information used to define, support, and/or otherwise maintain a collaboration environment. In some implementations, environment state information may be updated as users continue to interact with the collaboration environment over time. The environment state component 108 may store and/or archive the environment state information periodically and/or based on user request to archive and/or generate historical state information. By way of non-limiting illustration, the historical environment state information may specify historical values of one or more parameters, and/or other information.

The user information may include values of user parameters. The values of the user parameters may be organized in user records corresponding to users interacting with and/or viewing the collaboration environment. The values of the user parameters associated with the users interacting with and/or viewing the collaboration environment may include information describing the users, their actions within the collaboration environment, their settings, and/or other user information; and/or metadata associated with the users, their actions within the environment, their settings, and/or other user information. Individual ones of the users may be associated with individual ones of the user records. A user record may define values of the user parameters associated with a given user interacting with and/or viewing the collaboration environment.

The values of the user parameters may, by way of non-limiting example, specify one or more of: a name, a user name, a group parameter, a user account, user role information, a user department, descriptive user content, a to-email, a from-email, a photo, an organization, a workspace, one or more projects (which may include project parameters defined by one or more work unit records), one or more items of work (which may include one or more unit of work parameters defined by one or more unit of work records), one or more user comments, one or more teams the user belongs to, one or more of the user display settings (e.g., colors, size, project order, task order, other unit of work order, etc.), one or more authorized applications, one or more interaction parameters (e.g., indicating a user is working on/worked on a given unit of work, a given user viewed a given work unit of work, a given user selected a given unit of work, a timeframe a given user last interacted with and/or worked on a given unit of work, a time period that a given unit of work has been idle, and/or other interaction parameters), a presence parameter (e.g., indicating presence and/or interaction level at an environment level, unit of work level, project level, task level, application level, etc.), one or more notification settings, one or more progress parameters, status information for one or more work units the user is associated with (units of work assigned to the user, assigned to other users by the user, completed by the user, past-due date, and/or other information), one or more performance metrics of a given user (e.g., how many units of work the user has completed, how quickly the user completed the units of work, how quickly the user completes certain types of work units, the efficiency of the user, bandwidth of the user, activity level of the user, etc.), application access information (e.g., username/password for one or more third-party applications), one or more favorites and/or priorities, schedule information, other user parameters for the given user.

User role information may specify individual roles of the individual users. A role may represent a position of an individual user. The position may be specified based on a description of one or more of job title, level, stage, and/or other descriptions of position. The role may be specified with respect to a company as a whole, a particular unit of work, and/or other considerations. By way of non-limiting illustration, a role may include one or more of chief executive officer (or other officer), owner, manager, supervisor, accountant, associate, employee, intern, entry level, midlevel, senior, administrator, director, foreman, engineer, product developer, human resource officer, artist, art director, and/or other descriptions. In some implementations, roles of users may be defined by a role hierarchy. A role hierarchy may convey individual positions of individual roles in the role hierarchy. By way of non-limiting illustration, a position may specify one or more of a role being superior to role, a role being subordinate to role, and/or other information. One or more features and/or functionality described herein may have some restrictions placed on it by virtue of a role of a user.

Schedule information for the individual users may include one or more calendar entries associated with the individual users. The individual calendar entries may be associated with individual start dates and/or individual end dates. In some implementations, schedule information may be stored locally within electronic storage 128 by virtue of features and/or functionality provided within a collaboration environment. By way of non-limiting illustration, a collaboration environment may have the features and/or functionality of calendar applications configured to facilitate calendaring entries into a schedule. It is noted that schedule information may be determined through features and/or functionality provided by one or more external resources 126. By way of non-limiting illustration, an external resource may include a calendar application which may be external to a collaboration environment. The collaboration environment may have permissions to access the external calendar application to determine and/or obtain schedule information.

The work information may include values of one or more work unit parameters. The values of the work unit parameters may be organized in work unit records corresponding to units of work managed, created, completed, and/or assigned to individual users within the collaboration environment. A given work unit may have one or more assignees and/or team members working on the given unit of work. Units of work may correspond to one or more to-do items, action items, objectives, and/or other units of work one or more users should accomplish and/or plan on accomplishing. Units of work may be created by a given user for the given user and/or created by the given user and assigned to one or more other users. A given unit of work may include one or more or a project, a task, a sub-task, and/or other units of work possibly assigned to and/or associated with one or more users. A project may include a set of one or more units of work.

In some implementations, individual sets of work unit records may be defined by a record hierarchy. A record hierarchy may convey individual positions of work unit records (and their corresponding units of work) in the record hierarchy. By way of non-limiting illustration, a position may specify one or more of a work unit record being superior to another work unit record, a work unit record being subordinate to another work unit record, and/or other information. As a result, individual work unit records in the individual sets of work unit records may be subordinate to other individual work unit records in the individual sets of work unit records. For example, a work unit record may define a unit of work comprising a task, and a subordinate work unit record may define a unit of work comprising a sub-task to the task. A record hierarchy may define a relationship between work unit records. A work unit record may have some restrictions placed on it by virtue of having a subordinate work unit record. By way of non-limiting illustration, a work unit record may be restricted from access by one or more users unless and/or until a subordinate work unit record is completed and/or started.

Individual work units records may include hierarchical information defining a record hierarchy of the individual work unit records. The hierarchical information of a work unit record may include one or more of information identifying other work unit records associated in a record hierarchy the work unit record belongs to, a specification of the position of the work unit record in the hierarchy, restrictions and/or other relationships placed on the work unit record by virtue of its position, and/or other information.

In some implementations, as a consequence of the record hierarchies, the individual units of work described in the individual work unit records that are subordinate to the other individual work unit records may be subordinate to the individual units of work in the other individual work unit records.

In some implementations, the one or more work unit parameters may include one or more of a work assignment parameter, a work management parameter, a work creation parameter, a meeting parameter, and/or other parameters. The values of the work assignment parameter may describe units of work assigned to the individual users. The values of the work management parameter may describe units of work managed by the individual users. The values of the work creation parameter may describe units of work created by the individual users. The values of a meeting parameter for the individual units of work may reflect a desire to include the individual units of work in the individual meetings (see, e.g., work unit component 112 described herein).

In some implementations, the units of work may be described based on one or more of a unit of work name, a unit of work description, one or more unit of work dates (e.g., a start date, a due date, a completion date, and/or dates), one or more members associated with a unit of work (e.g., an owner, one or more other project/task members, member access information, and/or other unit of work members and/or member information), a status parameter (e.g., an update, a hardcoded status update, a completed/uncomplete/mark complete, a measured status, a progress indication, quantity of sub-work units remaining for a given unit of work, completed work units in a given project, and/or other status parameter), one or more user comment parameters (e.g., permission for who may comment such as a creator, a recipient, one or more followers, and/or one or more other interested parties; content of the comments; one or more times; presence or absence of the functionality of up-votes; one or more hard-coded responses; and/or other parameters.), one or more interaction parameters (e.g., indicating a given unit of work is being worked on/was worked on, given work unit of work was viewed, a given unit of work was selected, how long the given unit of work has been idle, a last interaction parameter indicating when and what user last interacted with the given unit of work, users that interacted with the given unit of work, and/or other interaction parameters indicating sources of the interactions, context of the interactions, content of the interactions and/or time for the interactions), one or more file attachments, notification settings, privacy, an associated URL, one or more interaction parameters (e.g., sources of the interactions, context of the interactions, content of the interactions, time for the interactions, and/or other interaction parameters), updates, ordering of units of work within a given unit of work (e.g., tasks within a project, subtasks within a task, etc.,), state of a workspace for a given unit of work (e.g., application state parameters, application status, application interactions, and/or other parameters related to the state of the workspace for a unit of work), dependencies between one or more work units, one or more custom fields (e.g., priority, cost, stage, and/or other custom fields), quantities of work production for the unit of work (e.g., quantity of lines of code, quantity of lines of copy, etc.), other work unit parameters for the given work units, and/or other work unit parameters, and/or user parameters for one or more users and/or work units the given project is associated with.

The values of the work assignment parameter describing units of work assigned to the individual users may be determined based on one or more interactions by one or more users with a collaboration environment. In some implementations, one or more users may create and/or assign one or more unit of work to themselves and/or an other user. In some implementations, a user may be assigned a unit of work and the user may effectuate a reassignment of the unit of work from the user or one or more other users.

In some implementations, values of the work assignment parameter may indicate that a status parameter of a unit of work has changed from "incomplete" to "marked complete" and/or "complete". In some implementations, a status of complete for a unit of work may be associated with the passing of an end date associated with the unit of work. In some implementations, a status of "marked complete" may be associated with a user providing input via the collaboration environment at the point in time the user completes the unit of work (which may be before or after an end date).

The objective information may include values of one or more objective parameters. The values of the objective parameters may be organized in objective records corresponding to business objectives managed, created, and/or owned within the collaboration environment. Individual objective records may describe individual business objectives and identify sets of individual ones of the work unit records that specify the units of work associated with the individual business objectives. The business objectives may be associated with a set of units of work that may indirectly facilitate progress toward fulfillment of the business objectives. The set of units of work may not directly contribute to the progress. By way of non-limiting illustration, a connection between the set of units of work and a corresponding business objective may be indirect in that completion of at least one of the units of work may have no direct impact on progress toward fulfillment of the business objective. The concept of "no direct impact" may mean that completion of the at least one unit of work may not cause progress toward fulfillment of the business objective without independent action outside of the at least one unit of work. Instead, the fulfillment of the at least one business objective may make such independent action more likely (e.g., through coercion, assistance, education, incentivization, reminder, etc.). However, in some implementations, business objectives may be associated with a set of units of work that may directly facilitate progress toward fulfillment of the business objectives. Accordingly, completion of the set of units of work may directly contribute to the progress toward fulfillment.

A given business objective may have one or more collaborators, and/or team members working on the given business objective. Business objectives may be created by a given user for the given user and/or created by the given user and assigned to be owned to one or more other users. Individual business objectives may include one or more of an individual goal, an individual sub-goal, and/or other business objectives assigned to be owned by a user and/or associated with one or more users. Business objectives may be specified on an individual user basis, team of users basis, organization as a whole basis, and/or specified in other ways.

In some implementations, business objectives may be derived from, and/or associated with, events and/or other information. The events may be external and/or integral to the collaboration environment. Events may include occurrences within an external resource (e.g., external resources 126) and/or occurrences in the real world.

External resources may include application programs accessible to the collaboration environment. An application program may be external to the collaboration environment and/or integrated into the collaboration environment. An application program external to the collaboration environment may be accessible by exiting (closing, minimizing, etc.) the environment and launching the application program separately. An application program integrated into the collaboration environment may be accessible within the environment and/or that access may not require leaving or exiting the environment. By way of non-limiting illustration, a business objective may be to reach a given quantity of subscribers on a social media page. The business objective may be derived from an event including a social media application showing subscribership to the social media page is reaching and/or exceeding the given quantity of subscribers. By way of non-limiting illustration, a business objective may be to increase the click-through-rate (CTR) on an ad on a webpage by a given percentage. The business objective may be derived from an event including an analytics program showing the CTR for the ad.

An occurrence within the real world may be determined through human observation with and/or without the assistance of a computer. By way of non-limiting illustration, a business objective may be to become more prominent in a given field of industry. The business objective may be derived from an event including the business being mentioned in an article written about the given field of industry. By way of non-limiting illustration, a business objective may be to onboard five new clients in a given month. The business objective may be derived from an event including observing the number of new clients being onboarded that given month. By way of non-limiting illustration, a business objective may be to increase the flow of foot traffic into a shop. The business objective may be derived from an event including observing the number of customers walking into the shop.

Individual sets of objective records may be defined by an objective record hierarchy. An objective record hierarchy may convey individual positions of objective records (and their corresponding business objectives) in the objective record hierarchy. By way of non-limiting illustration, a position may specify one or more of an objective record being superior to one or more other objective records, an objective record being subordinate to one or more other objective records, and/or other information. As a result, individual objective records may be subordinate and/or superior to other individual objective records. For example, the objective records may further include a second objective record. The first objective record and the second objective record may be organized by a first objective record hierarchy specifying that the second objective record is subordinate to the first objective record. Individual objective records may include hierarchical information defining an objective record hierarchy of the individual objective records. The hierarchical information of an objective record may include one or more of information identifying other objective records associated in an objective record hierarchy, a specification of the position of the objective record in the hierarchy, other relationships placed on the objective record by virtue of its position, and/or other information. In some implementations, as a consequence of the objective record hierarchies, the individual business objectives described in the individual objective records that are subordinate to the other individual objective records may be subordinate to the individual business objectives in the other individual objective records.

In some implementations, the one or more objective parameters may include one or more of an objective definition parameter, an objective progress parameter, and/or other parameters. The value of the objective definition parameter may describe a particular business objective. The values of an objective progress parameter may specify progress for a particular business objective, and/or other information.

In some implementations, the business objectives may be described based on one or more of a business objective specification, one or more business objective dates (e.g., a start date, a due date, and/or dates), one or more members associated with a business objective (e.g., an owner, one or more other project/task members, member access information, and/or other business objective members and/or member information), one or more interaction parameters (e.g., indicating a given business objective was viewed, a given business objective was selected, how long the given business objective has been idle, a last interaction parameter indicating when and what user last interacted with the given business objective, users that interacted with the given business objective, and/or other interaction parameters indicating sources of the interactions, context of the interactions, content of the interactions and/or time for the interactions), notification settings, privacy, one or more custom fields (e.g., priority, cost, stage, and/or other custom fields), identification of units of work associated with a business objective, and/or other information.

A business objective specification may include one or more of what the business objective is (e.g., what is the desired outcome), an event associated with the business objective, an external resource associated with the business objective, and/or other information.

The meeting component 110 may be configured to determine and/or obtain user input information and/or other information. The user input information may convey user input from individual users to initiate individual meetings with one other individual user. By way of non-limiting illustration, the user input information may convey the user input of a second user to initiate a first meeting with the first user. In some implementations, initiating individual meetings with an individual user may be based on one or more of an identification of the individual user, an identification of a work unit record and/or unit of work linked to the individual user, and/or other techniques. That is, the individual user may not need to be known at the time of initiating the individual meeting, but may be determined after and/or concurrently with the user input initiating the individual meeting.

In some implementations, the meeting component 110 may be configured to obtain user role information and/or other information. The user role information may be obtained from environment state component 108. The user role information may specify individual roles of the individual users. In some implementations, accessibility to provide the user input to initiate individual meetings with the one other individual user may be limited to the users of a given role. Initiation of the individual meetings may be based on the user role information of the individual users. For example, a user having an "intern" role and/or other role may not be provided accessibility to initiate a meeting. A user having a "manager" role and/or other role may be provided accessibility to initiate a meeting.

In some implementations, the accessibility to provide the user input to initiate individual meetings may be limited to the users of a given role and/or may be limited to meetings with users of one or more other given roles. For example, the user having the "intern" role may not be provided accessibility to initiate a meeting with a user having a "CEO" role but may be provided accessibility to initiate a meeting with the user having the "manager" role. Such accessibilities to provide the user input to initiate individual meetings may be modified (e.g., a particular user having an "intern" role may initiate meetings with any user or with particular other users), enabled for a limited period of time, enabled indefinitely, and/or fixed by an administrator of the system 100.

In some implementations, user input from individual users to initiate individual meetings with one other individual user may be facilitated in a variety of ways. In some implementations, user input may be facilitated by user entry and/or selection of a user interface element (e.g., a virtual button, and/or other user interface elements described herein). In some implementations, a user interface element to initiate individual meetings may be presented in one or more of individual user record pages for individual user records, individual work unit record pages for individual work unit records, individual work unit pages for individual units of work, and/or other pages and/or user interface portions of a collaboration environment.

In some implementations, an individual user record page for an individual user record may comprise a dashboard and/or other view where the individual user record (e.g., values of one or more user parameters and/or other information) for an individual user may be viewed, accessed, modified, and/or otherwise interacted with in other ways. In some implementations, a user interface element to initiate individual meetings presented within an individual user record page of an individual user record of a user may be specific to the user of the individual user record. By way of non-limiting illustration, the user interface element may facilitate initiating an individual one-on-one meeting with that user specifically. The user interface element may include indicia on the user interface element conveying the specificity to that user which may include, for example, "Schedule meeting with User X" (where "User X" is the name and/or username of the specific user). Accordingly, an other user may navigate to the user record page of the user and initiate a one-on-one meeting with the user by selecting the user interface element.

In some implementations, an individual work unit record page for an individual work unit record may comprise a dashboard and/or other view where the individual work unit record (e.g., values of one or more work unit parameters and/or other information) may be viewed, accessed, modified, and/or interacted with in other ways. In some implementations, a user interface element to initiate individual meetings presented within an individual work unit record page of an individual work unit record may be specific to that individual work unit record. By way of non-limiting illustration, the user interface element may facilitate initiating an individual one-on-one meeting with one or more users associated with that work unit record. The one or more users associated with that work unit record may include a user linked to that work unit record in one way or another. The user interface element may include indicia on the user interface element conveying the specificity to that work unit record which may include, for example, "Schedule meeting with a user of this work unit record". Accordingly, an other user may navigate to the work unit record page and initiate one or more one-on-one meetings with the one or more users linked to the work unit record by selecting the user interface element. In this manner, the other user initiating the meeting may not yet be aware of the user with which they are initiating the meeting with. For example, the other user may desire to merely have a one-on-one meeting about a particular work unit record, where the other party will be revealed shortly. By way of non-limiting illustration, after selecting the user interface element, the other user may be prompted with a pop up window (and/or other user interface element) where the one or more users linked with the work unit record may be shown. The other user may then select an individual user from the pop up window with whom they want to have the one-on-one meeting with.

In some implementations, an individual work unit page for an individual unit of work may comprise a dashboard and/or other view where the individual unit of work (e.g., values of one or more work unit parameters and/or other information) may be viewed, accessed, modified, and/or interacted with in other ways. An individual work unit page may comprise a user interface where an individual unit of work is worked on by one or more users. By way of non-limiting illustration, an individual work unit page may show values of one or more work unit parameters including one or more of title, description, assignee, assignor, start date, due date, and/or other values. A work unit page of a unit of work may differ from a work unit record page for a work unit record for that unit of work in that the individual work unit record page may be a more robust view of the unit of work, e.g., showing more and/or different information about the unit of work than may appear in the work unit page. That is, the work unit page may show information necessary for an assignee to complete the unit of work (e.g., a subset of the values of the work unit parameters, including one or more of title, description, assignee, assignor, start date, due date, and/or other values), while the work unit record page may show a more complete view of the unit of work such as a complete set of values of one or more parameters, metadata, and/or other information.

In some implementations, a user interface element to initiate individual meetings presented within an individual work unit page of an individual unit of work may be specific to that individual unit of work and/or a particular user linked to that individual unit of work (e.g., assignee, assignor, and/or other users). By way of non-limiting illustration, the user interface element may facilitate initiating an individual one-on-one meeting with an assignee of the unit of work. The user interface element may include indicia on the user interface element conveying the specificity to that unit of work which may include, for example, "Schedule meeting with assignee of Task A" (where "Task A" is the unit of work associated with the work unit page). Accordingly, an other user may navigate to the work unit page and initiate a one-on-one meeting with the assignee of the unit of work (and/or other user linked to the unit of work) by selecting the user interface element.

The work unit component 112 may identify one or more of the work unit records, objective records, and/or other records corresponding to the users of the individual meetings. The work unit component 112 may identify records corresponding to the users of the individual meetings in response to receiving the user input to initiate the individual meetings. The records being identified may be ones linked to one of the users of the individual meetings and/or both of the users of the individual meetings. By way of non-limiting illustration, the work unit records being identified may correspond to a subordinate one of the users (e.g., based on role). By way of non-limiting illustration, the objective records being identified may correspond to both the users (e.g., both the users are working to fulfill the business objective). By way of non-limiting illustration, responsive to obtaining the user input from the second user, a first subset of work unit records from the first set of work unit records and/or one or more objective records may be identified. The first subset of work unit records may include a subset from the first set of work unit records that are linked to both the first user and the second user. By way of non-limiting illustration, further responsive to obtaining the user input from the second user, a second subset of work unit records may be identified. The second subset of work unit records may include work unit records linked to the second user.

In some implementations, the work unit records being identified may correspond to a set of work unit records within a record hierarchy. By way of non-limiting illustration, responsive to obtaining the user input from the second user, the first subset of work unit records from the first set of work unit records may be identified. The first subset of work unit records may include a subset from the first set of work unit records that are part of a common record hierarchy.

In some implementations, identifying the work unit records (and/or objective records) corresponding to one or more users of the individual meetings (i.e., by work unit component 112) may include determining a date range and/or one or more particular dates. The work unit records (and/or objective records) being identified may correspond to a set of work unit records tailored to the date range and/or one or more particular dates. This may allow a user to tailor a one-on-one meeting to recent, current, and/or further work unit records as opposed to all work units records (e.g., which may include records too far into the past and/or future). The date range and/or the one or more particular dates may specify a range of particular start dates for units of work, a range of or particular end dates for units of work, and/or both. In some implementations, the date range may be specified by the individual users providing the user input to initiate the individual meetings (e.g., the second user). In some implementations, the one or more particular dates may be specified by the individual users providing the user input to initiate the individual meetings and/or the users (e.g., the first user and the second user) of the individual meetings. Thus, work unit component 112 may be configured to identify the work unit records for the units of work having start dates and/or end dates that fall within the date range, and/or identify the work unit records for units of work having a particular start date and/or a particular end date. By way of non-limiting illustration, the first subset of work unit records may be for a first subset of units of work that falls within a date range. By way of non-limiting illustration, an end date may be specified by the second user and determined by work unit component 112. The units of work of the first subset of units of work may fall within the date range or have the end date.

In some implementations, a date range in which work unit records (and/or objective records) may be identified for an individual meeting may be a range between a date of a prior one-on-one meeting and a current date. This may facilitate the streamlining of recurring one-on-one meetings where progress following prior meetings may be reviewed and/or evaluated by looking at the work unit records occurring after the prior meetings.

In some implementations, the work unit component 112 may identify the work unit records (and/or objective records) corresponding to the users of the individual meetings based on user input from the individual users and/or other information. In some implementations, the user input may include entry and/or selection to identify the work unit records for inclusion in the individual meetings. In some implementations, the entry and/or selection to identify the work unit records for inclusion in the individual meetings may be done prior to and/or concurrently with the user input to initiate the individual meetings. By way of non-limiting illustration, leading up to a desire to initiate an individual meeting, a user may provide entry and/or selection to identify one or more work unit records for inclusion in a forthcoming individual meeting. In this way, a user may tailor a meeting to specific work unit records based on their specific selection of work unit records.

In some implementations, responsive to obtaining the user input from the individual users including the entry and/or selection to identify the work unit records (and/or objective records) for inclusion in the individual meetings, work unit component 112 may be configured to specify individual values of a meeting parameter for the individual units of work (and/or business objective) to reflect the inclusion in the individual meetings. The value of the meeting parameter may be, for example, quantitative (e.g., "0" meaning not included in the individual meeting, "1" meaning included in the individual meeting), qualitative (e.g., "mtg" meaning to be included in the individual meeting, "nomtg" meaning to not be included in the individual meeting), and/or other values that may reflect inclusion, or lack thereof, in the individual meetings. In some implementations, the entry and/or selection to identify the work unit records for inclusion in the individual meetings may be based on entry and/or selection of a user interface element presented on one or more of a work unit record page, a work unit page, and/or other views within a collaboration environment. By way of non-limiting illustration, a user interface element may include a check box (and/or other user interface element) which the selection thereof may cause the identification for inclusion in the individual meetings. Accordingly, work unit component 112 may be configured to identify individual work unit records for inclusion in individual meetings based on individual work unit records specifying the individual values of the meeting parameter reflecting inclusion in the individual meetings.

The agenda generation component 114 may be configured to generate agenda information and/or other information related to the individual meetings. The agenda information may define individual agendas for the individual meetings. The individual agendas may include sets of agenda items and/or other items related to the individual meetings. Individual agenda items may correspond to an individual record having been identified as corresponding to one or more users of the individual meetings. The individual agenda items may include and/or facilitate access to the corresponding ones of the individual records. For example, an individual agenda item may include a corresponding work unit record on the agenda and/or the individual agenda item may include a link (e.g., hyperlink, pointer, resource identifier, etc.) to access the corresponding work unit record. For example, an other agenda item may include a corresponding objective record on the agenda and/or the individual agenda item may include a link (e.g., hyperlink, pointer, resource identifier, etc.) to access the corresponding objective record. In some implementations, a record included on the agenda may include one or more of a summary of the record, a copy of the record, and/or other information. By way of non-limiting illustration, a summary of the work unit record may include values of a subset of parameters deemed of most importance. Importance may be specified by a user and/or an administrator of the system. A copy of the work unit record may be utilized to ensure the actual work unit record is not accidentally modified, deleted, and/or otherwise interacted with in unintended ways. Work unit records may be represented in agendas in other ways.

By way of non-limiting illustration, the agenda information may define a first agenda for the first meeting. The first agenda may include a first set of agenda items and/or other information. Individual agenda items in the first set of agenda items may correspond to individual work unit records in the first subset of work unit records, one or more objective records, and/or other information.

In some implementations, agenda generation component 114 may be configured to obtain performance information for the individual users. The agenda generation component 114 may be configured such that the agenda information for the individual meetings include the performance information for at least one of the users of the individual meetings. The performance information may include one or more performance metrics for the individual users. A performance metric may be expressed in a variety of ways. By way of non-limiting illustration, a performance metric may include a measure based on one or more of how many days of work the user has missed, how many units of work have been completed in a given period of time, how many units of work have been completed on or prior to a due date within a given period of time, reviews submitted by other users (e.g., from a performance review questionnaire), and/or other measures. The above description of performance metrics is not intended to be limiting. Instead, it is to be understood that performance metrics of one or more other definitions may be utilized for the purpose of inclusion in an agenda of a one-on-one meeting as needed for review and/or evaluation of a user.

In some implementations, agenda generation component 114 may be configured to obtain scheduling information and/or other information for the individual users. The scheduling information may be obtained from the environment state component 108 and/or from external resources 126. The scheduling information may include one or more of one or more calendar entries, individual calendar entries being specified within and/or outside the collaboration environment, and/or other scheduling information for the individual users. The agenda generation component 114 may be configured to determine individual meeting times for the individual meetings based on the scheduling information. The individual meeting times may be determined based on co-availability of the users of the individual meetings. In some implementations, the meeting times may be automatically determined. In some implementations, the meeting times may be proposed and communicated to one or more users. The users may have an opportunity to confirm and/or request changes to the meeting times. In some implementations, based on meeting times for the individual meeting, the scheduling information may be updated and/or edited to include one or more calendar entries for the individual meetings at the scheduled times.

In some implementations, the agenda generation component 114 may be configured to generate meeting-specific units of work for the individual meetings. The meeting-specific units of work may include one or more of the agenda information, requests to obtain particular information prior to the individual meeting, requests to review particular information prior to the individual meeting, requests to note details from the individual meetings subsequent to the individual meetings, and/or other information. The meeting-specific units of work may be dated for the individual meeting times, a particular time prior to the individual meeting times, a particular time subsequent to the individual meeting time, and/or other times. The meeting-specific units of work may be presented to the individual users of the individual meetings via a user interface for the collaboration environment.

Environment state component 108 may be configured to effectuate presentation of individual user interfaces on individual client computing platforms of one or more client computing platforms 104. The individual client computing platforms may access a user interface over network 116. A user interface may include one or more user interface portions. By way of non-limiting illustration, a user interface may include one or more of an input portion, a display portion, and/or other portions. Individual portions may include one or more user interface elements configured to facilitate user interaction with the user interface. By way of non-limiting illustration, user interface elements may include one or more of text input fields, drop down menus, check boxes, display windows, pop up windows, virtual buttons, and/or other elements configured to facilitate user interaction.

An input portion of a user interface may be configured to obtain user input comprising user entry and/or selection of information (e.g., identifications of users, date/time entries, and/or other information). The input portion may comprise one or more text input fields, one or more check boxes, one or more drop down menus, and/or other user interface elements configured to accept user entry and/or selection of information.

A display portion may be configured to display a visualization of the scheduling information, one or more units of work, performance information, work unit record pages, user record pages, work unit pages, agenda, agenda information, and/or other features described herein.

Figure 3:
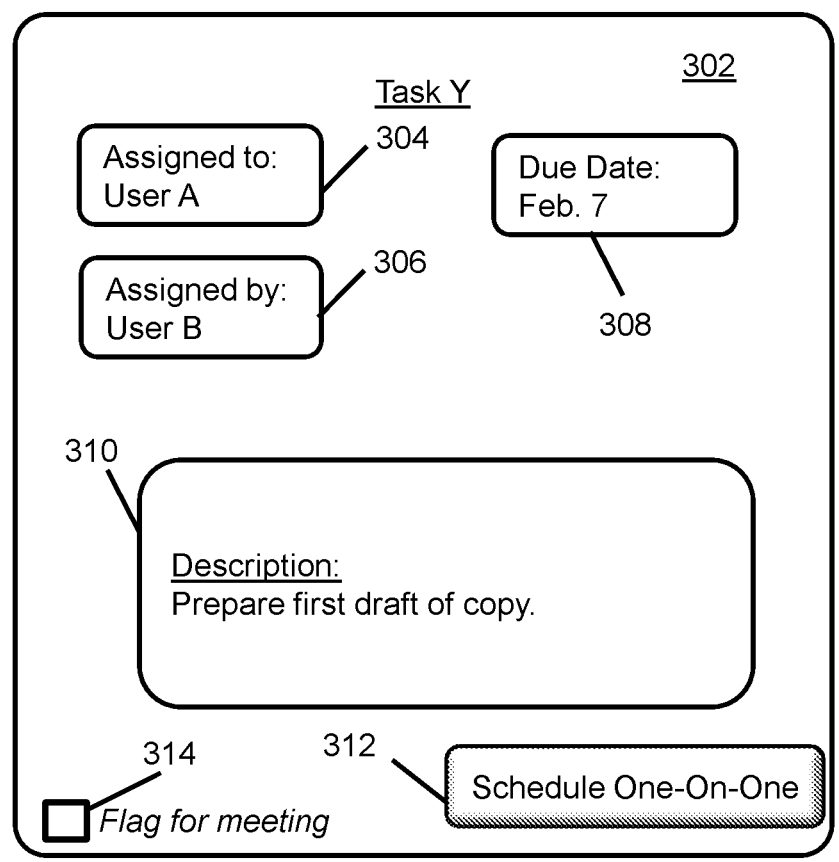
FIG. 3 illustrates an exemplary user interface, in accordance with one or more implementations.

FIG. 3 illustrates a user interface 300, in accordance with one or more implementations. The user interface 300 may display a work unit page for a first unit of work. The user interface 300 may display different values of one or more work unit parameters of the first unit of work, and/or other information. By way of non-limiting illustration, a user interface element 302 may display a title of the first unit of work (e.g., Task Y). A user interface element 304 may display an assignee of the first unit of work (e.g., User A). A user interface element 306 may display an assignor of the first unit of work (e.g., User B). A user interface element 308 may display a due date of the first unit of work. A user interface element 310 may display a description of the first unit of work. A user interface element 314 may be configured to obtain user input to identify a work unit record for the first unit of work for inclusion in a meeting. Responsive to obtaining the user input a value of a meeting parameter for the first unit of work may be specified to reflect the inclusion in a meeting.

A user interface element 312 may be configured to obtain user input to initiate a one-on-one meeting with a user linked to the first unit of work. The user linked to the first unit of work may include one or more of the assignee, assignor, and/or other users linked to the first unit of work. The user linked to the first unit of work whom with the meeting may be initiated may default to one or more of the assignee, assignor, and/or other users linked to the first unit of work. By way of non-limiting illustration, the user linked to the first unit of work may default to the assignee. Responsive to the user input, work unit records corresponding to one or both of users of the meeting may be identified. Agenda information defining an agenda for the meeting may be generated. The agenda may include a set of agenda items where individual agenda items correspond to individual work unit records.

It is noted that FIG. 3 is for illustrative purposes only and is not to be considered limiting. Instead, it is to be understood that the user interface 300 may be configured in other ways and/or including other elements in accordance with one or more implementations of the system 100 presented herein.

Figure 4:
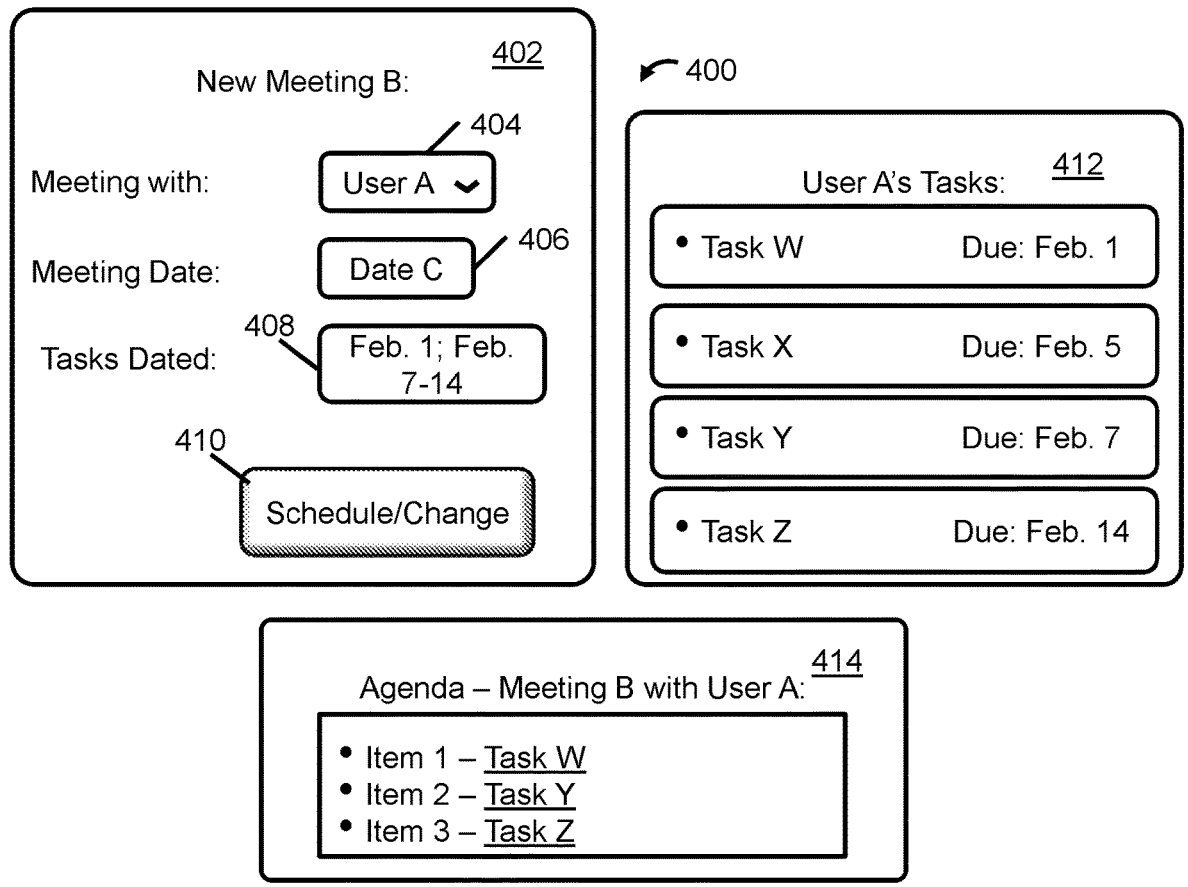
FIG. 4 illustrates an exemplary user interface, in accordance with one or more implementations.

FIG. 4 illustrates an exemplary user interface 400 generating agendas for one-on-one meetings, in accordance with one or more implementations. The user interface 400 may facilitate obtaining user input to initiate a meeting and/or modify agenda information and/or other information about a one-on-one meeting (e.g., Meeting B). The user interface 400 may include one or more of a meeting window 402, a task list window 412 displaying a set of units of work, and a meeting agenda window 414. Meeting window 402 may facilitate initiating and/or making changes to individual meetings by individual users. Meeting window 402 may represent a window that may pop up responsive to selection of user interface element 312 in FIG. 3. Meeting window 402 may include user interface elements 404, 406, 408, and/or 410. User interface element 404 (e.g., a dropdown menu) may facilitate user entry and/or selection of a user (e.g., User A) to initiate a meeting with. User interface element 406 may facilitate user entry of a date for the meeting (e.g., Date C). User interface element 408 may facilitate user entry of one or more of a date range and/or a date of which work unit records (described for illustrative purposes as "task(s)") may be identified to be included in agenda information for the meeting. The meeting may be changed, initiated, and/or scheduled upon selection of user interface element 410 and the agenda information (e.g., in meeting agenda window 414) may be generated. The agenda information may include agenda items (e.g., items 1, 2, and 3). Based on the user entry via user interface element 408 (e.g., February 1; February 7-14), the agenda items may facilitate access to units of work created by, assigned to, and/or completed by User A within the date range(s) identified (e.g., Task W, Task Y, Task Z) for inclusion in the meeting.

It is noted that FIG. 4 is for illustrative purposes only and is not to be considered limiting. Instead, it is to be understood that the user interface 400 may be configured in other ways and/or including other elements in accordance with one or more implementations of the system 100 presented herein.

Figure 5:
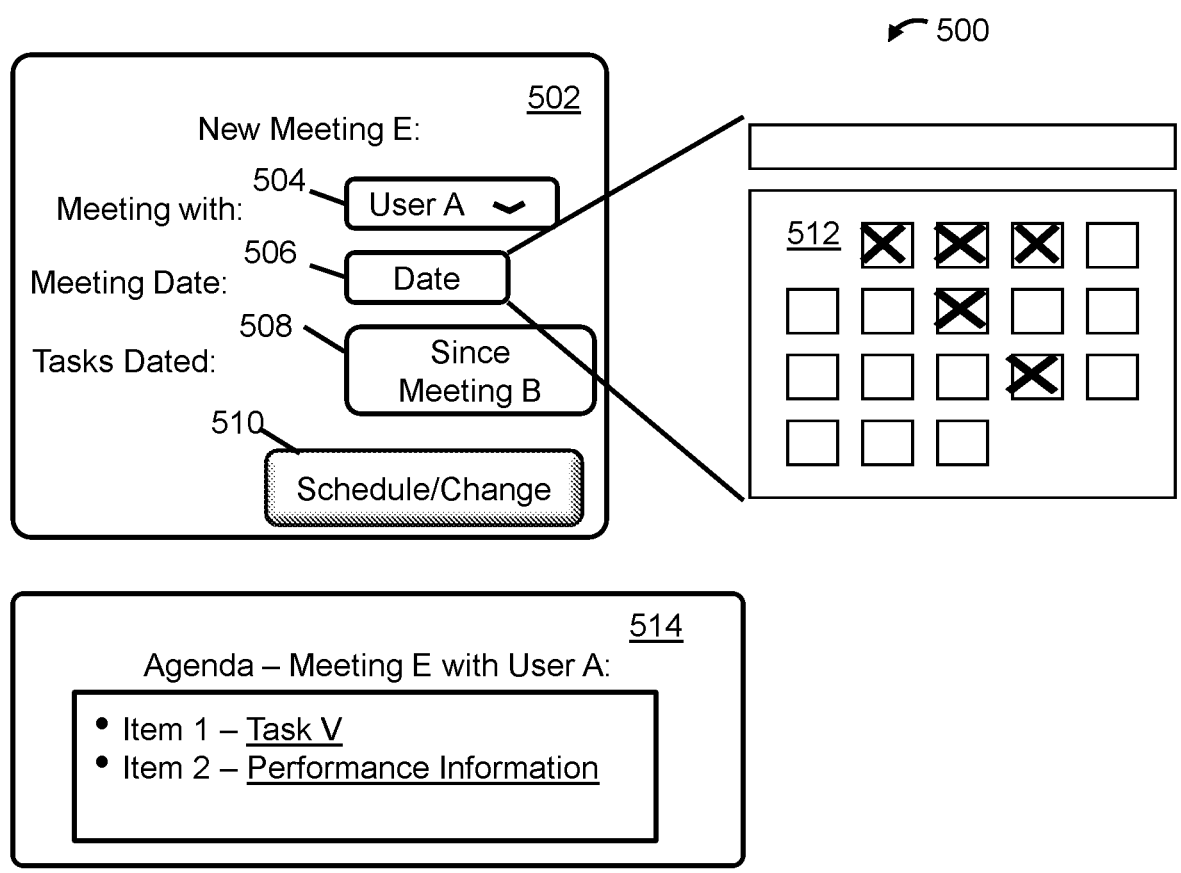
FIG. 5 illustrates an exemplary user interface, in accordance with one or more implementations.

FIG. 5 illustrates a user interface 500 generating agendas for one-on-one meetings, in accordance with one or more implementations. The user interface 500 may display a meeting window 502, a scheduling window 512, and a meeting agenda window 514. Meeting window 502 may facilitate initiating and/or making changes to individual meetings (e.g., Meeting E) by individual users. Meeting window 502 may include user interface elements 504, 506, 508, and 510. User interface element 504 (e.g., a dropdown menu) may facilitate user entry and/or selection of a user (e.g., User A from FIG. 4) to initiate a meeting with. User interface element 506 may facilitate user entry and/or selection of a date for the meeting. Upon selection of user interface element 506, scheduling information may be presented in scheduling window 512. Scheduling information may provide availability, for example, of User A to facilitate determining a meeting date and/or time. User interface element 508 may facilitate user entry of one or more of a date range and/or a date of which work unit records may be identified to be included in agenda information for the meeting (e.g., tasks since Meeting B of FIG. 4). The meeting may be initiated, changed, and/or scheduled upon selection of user interface element 510 and the agenda information (e.g., shown in meeting agenda window 514) may be generated. The agenda information in meeting agenda window 514 may include agenda items (e.g., items 1 and 2). Based on the user entry via user interface element 508 (e.g., Since Meeting B), the agenda items may facilitate access to units of work created by, assigned to, and/or completed by User A may be identified (e.g., Task V) since Meeting B of FIG. 4. The agenda information may further include an agenda item that facilitates access to performance information of User A (e.g., item 2).

It is noted that FIG. 5 is for illustrative purposes only and is not to be considered limiting. Instead, it is to be understood that the user interface 500 may be configured in other ways and/or including other elements in accordance with one or more implementations of the system 100 presented herein.

Returning to FIG. 1, in some implementations, server(s) 102, client computing platform(s) 104, and/or external resources 126 may be operatively linked via one or more electronic communication links. For example, such electronic communication links may be established, at least in part, via a network 116 such as the Internet and/or other networks. It will be appreciated that this is not intended to be limiting, and that the scope of this disclosure includes implementations in which server(s) 102, client computing platform(s) 104, and/or external resources 126 may be operatively linked via some other communication media.

A given client computing platform may include one or more processors configured to execute computer program components. The computer program components may be configured to enable an expert or user associated with the given client computing platform to interface with system 100 and/or external resources 126, and/or provide other functionality attributed herein to client computing platform(s) 104. By way of non-limiting example, the given client computing platform 104 may include one or more of a desktop computer, a laptop computer, a handheld computer, a tablet computing platform, a NetBook, a Smartphone, a gaming console, and/or other computing platforms.

External resources 126 may include sources of information outside of system 100, external entities participating with system 100, and/or other resources. In some implementations, some or all of the functionality attributed herein to external resources 126 may be provided by resources included in system 100.

Server(s) 102 may include electronic storage 128, one or more processors 130, and/or other components. Server(s) 102 may include communication lines, or ports to enable the exchange of information with a network 116 and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 128 may comprise non-transitory storage media that electronically stores information. The electronic storage media of electronic storage 128 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 128 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 128 may include one or more virtual storage resources (e.g., cloud storage, a virtual private network, and/or other virtual storage resources). Electronic storage 128 may store software algorithms, information determined by processor(s) 130, information received from server(s) 102, information received from client computing platform(s) 104, and/or other information that enables server(s) 102 to function as described herein.

Processor(s) 130 may be configured to provide information processing capabilities in server(s) 102. As such, processor(s) 130 may include one or more of a digital processor, an analog processor, a digital circuit designed to process information, an analog circuit designed to process information, a state machine, and/or other mechanisms for electronically processing information. Although processor(s) 130 is shown in FIG. 1 as a single entity, this is for illustrative purposes only. In some implementations, processor(s) 130 may include a plurality of processing units. These processing units may be physically located within the same device, or processor(s) 130 may represent processing functionality of a plurality of devices operating in coordination. Processor(s) 130 may be configured to execute components 108, 110, 112, 114, and/or other components. Processor(s) 130 may be configured to execute components 108, 110, 112, and/or 114, and/or other components by software; hardware; firmware; some combination of software, hardware, and/or firmware; and/or other mechanisms for configuring processing capabilities on processor(s) 130. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although components 108, 110, 112, and/or 114 are illustrated in FIG. 1 as being implemented within a single processing unit, in implementations in which processor(s) 130 includes multiple processing units, one or more of components 108, 110, 112, and/or 114 may be implemented remotely from the other components. The description of the functionality provided by the different components 108, 110, 112, and/or 114 described below is for illustrative purposes, and is not intended to be limiting, as any of components 108, 110, 112, and/or 114 may provide more or less functionality than is described. For example, one or more of components 108, 110, 112, and/or 114 may be eliminated, and some or all of its functionality may be provided by other ones of components 108, 110, 112, and/or 114. As another example, processor(s) 130 may be configured to execute one or more additional components that may perform some or all of the functionality attributed below to one of components 108, 110, 112, and/or 114.

Figure 2:
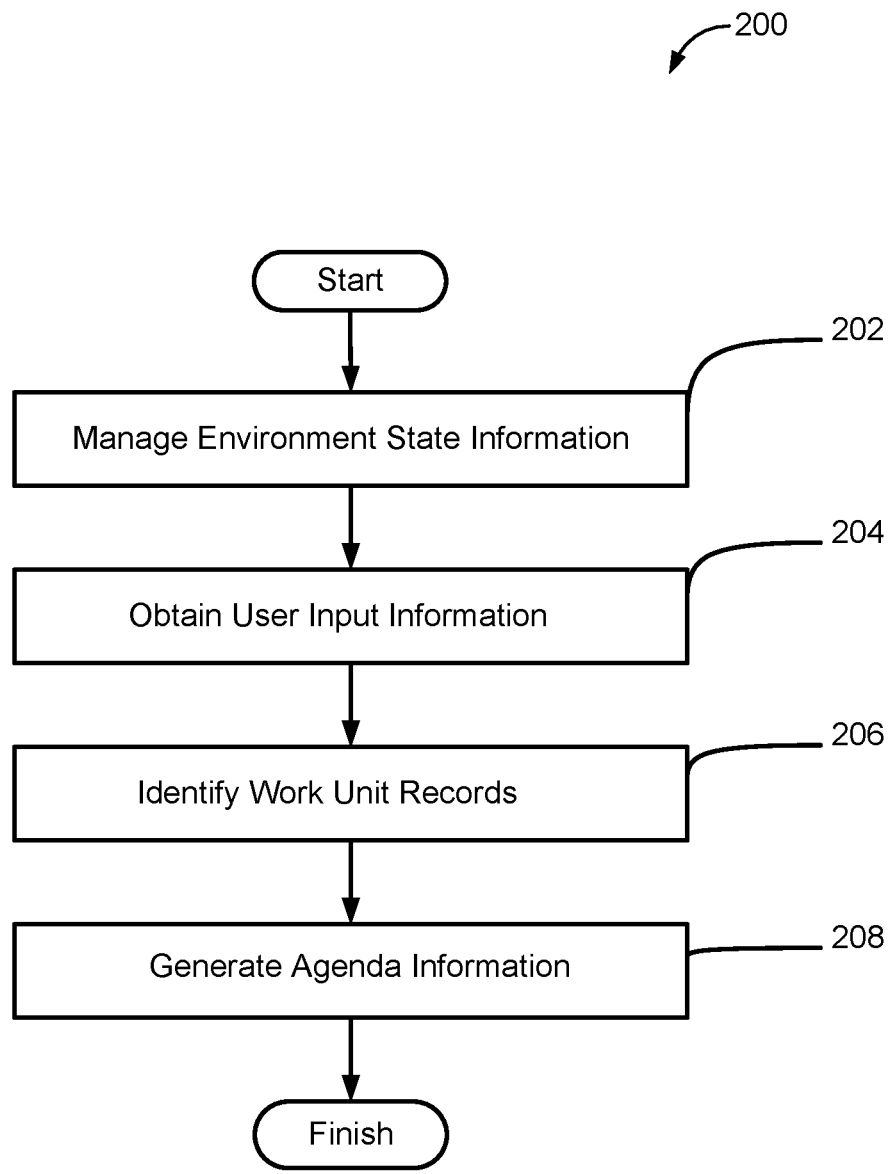
FIG. 2 illustrates a method to generate agendas for one-on-one meetings, in accordance with one or more implementations.

FIG. 2 illustrates a method 200 to generate agendas for one-on-one meetings, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

An operation 202 may manage environment state information maintaining a collaboration environment. The collaboration environment may be configured to facilitate interaction by users with the collaboration environment. Operation 202 may be performed by one or more hardware processors configured by machine-readable instructions including a component that is the same as or similar to environment state component 108, in accordance with one or more implementations.

An operation 204 may obtain user input information conveying user input from individual users to initiate individual meetings with one other individual user. Operation 204 may be performed by one or more hardware processors configured by machine-readable instructions including a component that is the same as or similar to meeting component 110, in accordance with one or more implementations.

An operation 206 may identify the work unit records corresponding to the users of the individual meetings. Operation 206 may be performed by one or more hardware processors configured by machine-readable instructions including a component that is the same as or similar to work unit component 112, in accordance with one or more implementations.

An operation 208 may generate agenda information defining individual agendas for the individual meetings. The individual agendas may include individual sets of agenda items. Operation 208 may be performed by one or more hardware processors configured by machine-readable instructions including a component that is the same as or similar to agenda generation component 114, in accordance with one or more implementations.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured to generate agendas for one-on-one meetings, the system comprising:
   one or more physical processors configured by machine-readable instructions to:
      manage, at a server, environment state information maintaining a virtual collaboration environment, the virtual collaboration environment being configured to facilitate interaction by users with the virtual collaboration environment by accessing the virtual collaboration environment via remotely located client computing platforms associated with the users over an Internet connection, the environment state information including work unit records of units of work previously created and assigned within the virtual collaboration environment to the users who are expected to accomplish one or more actions to complete the units of work;
      establish the Internet connection between the server and the remotely located client computing platforms;
      prior to conducting individual meetings, and responsive to obtaining requests from individual ones of the users to initiate the individual meetings with one other individual user:
         identify, at the server, the work unit records corresponding to the users who are participants of the individual meetings; and
         generate, at the server, agenda information defining individual agendas for the individual meetings, the individual agendas including agenda items that facilitate access to corresponding ones of the work unit records managed by the server; and
      effectuate communication of information from the server to the remotely located client computing platforms to cause the remotely located client computing platforms to present a meeting agenda window, the meeting agenda window displaying the agenda items of the individual agendas, the meeting agenda window being configured such that selection of individual ones of the agenda items causes presentation of individual work unit pages for individual ones of the corresponding ones of the work unit records.

2. The system of claim 1, wherein the one or more physical processors are further configured by the machine-readable instructions to:
obtain performance information for the individual ones of the users, the performance information including one or more performance metrics for the individual ones of the users; and
wherein the agenda information for the individual meetings includes the performance information for at least one of the users who is a participant of the individual meetings.

3. The system of claim 1, wherein identifying the work unit records corresponding to the users who are the participants of the individual meetings includes:
determining a date range; and
identifying the work unit records associated with start dates and/or end dates that fall within the date range.

4. The system of claim 3, wherein the date range is specified by the individual ones of the users who initiate the individual meetings.

5. The system of claim 3, wherein the date range is a range between a date of a prior meeting and a current date.

6. The system of claim 1, wherein identifying the work unit records corresponding to the users who are the participants of the individual meetings is based on specific user indication of the work unit records that should be included in the individual meetings.

7. The system of claim 6, wherein the specific user indication of the work unit records that should be included in the individual meetings is reflected in individual values of a meeting parameter stored within individual ones of the work unit records.

8. The system of claim 1, wherein the one or more physical processors are further configured by the machine-readable instructions to:
obtain scheduling information for the individual ones of the users, the scheduling information including one or more calendar entries, individual calendar entries being specified within and/or outside the virtual collaboration environment; and
determine individual meeting times for the individual meetings based on the scheduling information.

9. The system of claim 1, wherein the one or more physical processors are further configured by the machine-readable instructions to:
generate meeting-specific work unit records for the users who are the participants of the individual meetings.

10. The system of claim 1, wherein the one or more physical processors are further configured by the machine-readable instructions to:
obtain user role information specifying individual role of the individual ones of the users; and
wherein accessibility to initiate the individual meetings is limited to the users of a given role.

11. A method to generate agendas for one-on-one meetings, the method comprising:
managing, at a server, environment state information maintaining a virtual collaboration environment, the virtual collaboration environment being configured to facilitate interaction by users with the virtual collaboration environment by accessing the virtual collaboration environment via remotely located client computing platforms associated with the users over an Internet connection, the environment state information including work unit records of units of work previously created and assigned within the virtual collaboration environment to the users who are expected to accomplish one or more actions to complete the units of work;
establishing the Internet connection between the server and the remotely located client computing platforms;
prior to conducting individual meetings, and responsive to obtaining requests from individual ones of the users to initiate the individual meetings with one other individual user:
identifying, at the server, the work unit records corresponding to the users who are participants of the individual meetings; and
generating, at the server, agenda information defining individual agendas for the individual meetings, the individual agendas including agenda items that facilitate access to corresponding ones of the work unit records managed by the server; and
effectuating communication of information from the server to the remotely located client computing platforms to cause the remotely located client computing platforms to present a meeting agenda window, the meeting agenda window displaying the agenda items of the individual agendas, the meeting agenda window being configured such that selection of individual ones of the agenda items causes presentation of individual work unit pages for individual ones of the corresponding ones of the work unit records.

12. The method of claim 11, further comprising:
obtaining performance information for the individual ones of the users, the performance information including one or more performance metrics for the individual ones of the users; and
wherein the agenda information for the individual meetings includes the performance information for at least one of the users who is a participant of the individual meetings.

13. The method of claim 11, wherein the identifying the work unit records corresponding to the users who are the participants of the individual meetings includes:
determining a date range; and
identifying the work unit records associated with start dates and/or end dates that fall within the date range.

14. The method of claim 13, wherein the date range is specified by the individual ones of the users who initiate the individual meetings.

15. The method of claim 13, wherein the date range is a range between a date of a prior meeting and a current date.

16. The method of claim 11, wherein the identifying the work unit records corresponding to the users who are the participants of the individual meetings is based on specific user indication of the work unit records that should be included in the individual meetings.

17. The method of claim 16, wherein the specific user indication of the work unit records that should be included in the individual meetings is reflected in individual values of a meeting parameter stored within individual ones of the work unit records.

18. The method of claim 11, further comprising:
obtaining scheduling information for the individual ones of the users, the scheduling information including one or more calendar entries, individual calendar entries being specified within and/or outside the virtual collaboration environment; and
determining individual meeting times for the individual meetings based on the scheduling information.

19. The method of claim 11, further comprising:
generating meeting-specific work unit records for the users who are the participants of the individual meetings.

20. The method of claim 11, further comprising:
obtaining user role information specifying individual role of the individual ones of the users; and
wherein accessibility to initiate the individual meetings is limited to the users of a given role.

* * * * *